M. P. HOLMES.
ROTARY ENGINE.
APPLICATION FILED APR. 21, 1915.
1,207,555.
Patented Dec. 5, 1916.
2 SHEETS—SHEET 1.
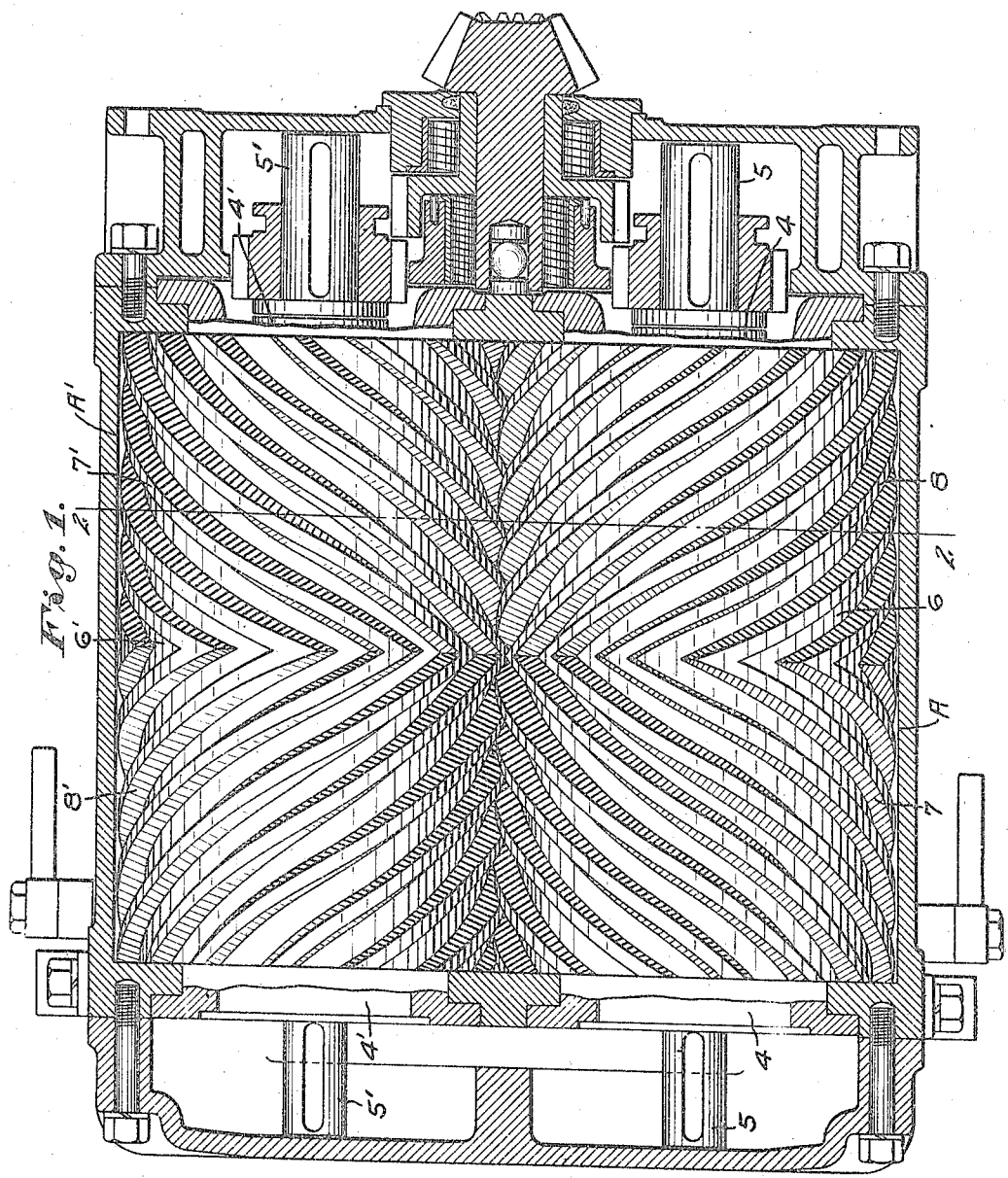
Inventor:
Morris P. Holmes,
by Emery, Booth, Janney & Varney
Attys.

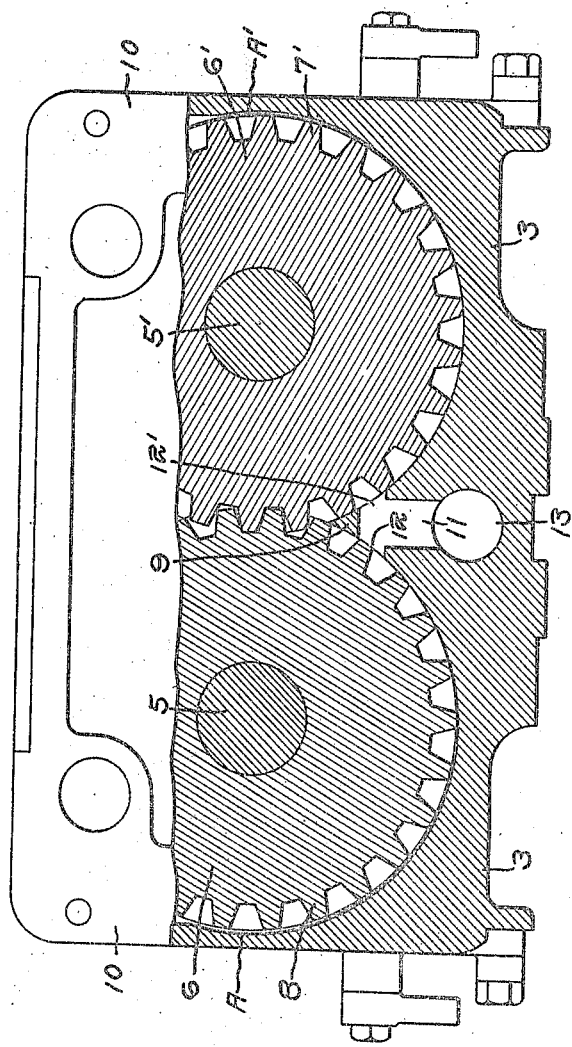

UNITED STATES PATENT OFFICE.

MORRIS P. HOLMES, OF CLAREMONT, NEW HAMPSHIRE, ASSIGNOR TO SULLIVAN MACHINERY COMPANY, OF BOSTON, MASSACHUSETTS, A CORPORATION OF MASSACHUSETTS.

ROTARY ENGINE.

1,207,555.

Specification of Letters Patent.

Patented Dec. 5, 1916.

Application filed April 21, 1915. Serial No. 22,950.

*To all whom it may concern:*

Be it known that I, MORRIS P. HOLMES, a citizen of the United States, and a resident of Claremont, in the county of Sullivan and State of New Hampshire, have invented an Improvement in Rotary Engines, of which the following description, in connection with the accompanying drawings, is a specification, like characters on the drawings representing like parts.

This invention relates to rotary engines, and is more particularly, though not exclusively, concerned with rotary engines of the type exemplified by the patents to Van Deventer, Nos. 996,169, 1,026,887 and 1,046,687, in which intermeshing rotors, to the teeth and blades of which the fluid is supplied, are mounted in a casing which at least partially encircles or envelops the rotors to confine the fluid to the blades between two points in the periphery of each rotor.

My invention will be best understood by reference to the following specification, when taken in connection with the accompanying drawings of one specific embodiment thereof, while its scope will be more particularly pointed out in the appended claim.

In the drawings: Figure 1 is a central longitudinal section, partly in elevation, of a rotary engine embodying my invention; and Fig. 2 is an end elevation of the same, partly in section, on line 2—2 of Fig. 1.

Referring to the drawings, and to the embodiment of my invention which I have selected for illustration, I have there shown, for the purposes of exemplification, a rotary engine comprising a base 3, provided with suitable bearings 4, 4, and 4', 4', having shafts 5 and 5', respectively, to which are secured rotors 6 and 6'. In the specific example, the rotor 6 is provided with a plurality of right-hand, helically-disposed tooth blades 7, extending across the rotor for substantially one-half its length, and a plurality of left-hand, helically-disposed tooth blades 8, extending across the rotor for substantially the remaining half of its length. In like manner, the rotor 6' is provided with a plurality of right-hand, helically-disposed tooth blades 7' extending across the rotor for substantially one-half its length, and a plurality of left-hand, helically-disposed tooth blades 8', extending across the rotor for substantially the remaining half of its length. The right and left-hand tooth blades of each rotor meet, and join each other at the center of the rotor. The right-hand tooth blades 7 of the rotor 6 are arranged to mesh with the left-hand tooth blades 8' of the opposite rotor 6', while the left-hand tooth blades 8 of the rotor 6 mesh with the right-hand tooth blades 7' of the rotor 6', thus securing transmission of rotation from one rotor to the other, and also forming buckets whereby the propulsion of the rotors is made possible in a well-known manner, which it is deemed unnecessary here to describe, since it forms no essential part of my invention, it being understood that this particular type of motor is selected merely for purposes of exemplification.

Disposed beneath the rotors, and preferably forming an integral part of the base 3, is a rib 9, which usually extends the full length of the rotors. This rib usually extends between the rotors to the point of intersection of the perimeter thereon and is usually in substantial conformity with the perimeters and in bearing contact therewith, except for the usual necessary working clearance which, in practice, is generally about two and one-half thousandths of an inch at a point adjacent the intermeshing portions of the peripheries of the rotors. The extent to which the rib envelops the rotors depends upon the number of tooth blades in each rotor, and the angle of the tooth blades to the rotor axes, it being necessary that the rib shall extend around the peripheries of the rotors far enough to confine the fluid under pressure to any pair of meshing tooth blades, until said blades cease to mesh, or until the full capacity of each bucket formed by the intermeshing tooth blades has been developed. As herein shown, the rib is continued around the rotors and substantially incloses them, thus forming a casing 10, in which the exhaust fluid may be confined, and from which it may be carried to any desired place. The usual inlet port is shown at 11, and is disposed at a point substantially midway between the ends of the rotors, and in the plane midway between their axes. In some forms of motors, this port is provided with branches 12 and 12' which lead in opposite directions, so that the fluid entering under pressure will be caused to impinge on both rotors simultaneously. A suitable supply passage 13, extending from a source of supply (not shown), conducts the fluid therefrom to the inlet 11, thus causing the rotors to be driven in a manner which it will be unnecessary here to describe, since it forms no essential part of my present invention.

In the use of rotary engines of the described type, it is found that under great stresses, to which the machine is sometimes subjected in certain classes of work, the motor frame distorts, or the rotors become displaced in a plane containing their axes to such an extent that the encircling or enveloping walls of the casing bear against the rotors, and cause them to heat, expand, and finally stick in the bores of the casing. It has heretofore been proposed to overcome this difficulty by greatly increasing the clearance between the rotors and the bores of the casing, but such increase of clearance has resulted in increasing the leakage and consequent air consumption of the engine, thus reducing its efficiency.

In order to prevent such distortion of the frame, or displacement of the rotors, or both, from causing the rotors to stick in the bores of the casing, while still preventing excessive leakage and loss of efficiency, I have formed the bores of the casing 10 eccentrically with relation to the peripheries of the rotors to provide gradually increasing clearances from the intermeshing portions of their peripheries toward diametrically opposite points in their peripheries, as shown in the somewhat exaggerated way in Fig. 2 for the purposes of illustration, it being noted that the eccentricity of the rotors with relation to the bores in the casing may be and in the present exemplification is in a plane containing the axes of the rotors. It is found in practice that the best results are secured by providing a clearance of two and one-half thousandths of an inch adjacent the inlets 12 and 12', and having the clearance gradually increase to the points A and A', where it amounts to nine thousandths of an inch. It is found in practice that this eccentricity of the rotors, under gradually increasing clearances, obviates any tendency of the rotors to stick and bind, while still preserving the maximum efficiency of the engines and with only a slight increase in its air or steam consumption, and therefore totally eliminates the difficulties heretofore experienced in the use of motors of this class.

Having thus described my invention, what I claim and desire by Letters Patent to procure is:

A rotary engine comprising, in combination, a pair of intermeshing rotors, and a casing therefor having internal walls at least partially encircling said rotors and formed eccentrically with relation to the peripheries thereof to provide gradually increasing clearances from the intermeshing portion of their peripheries toward diametrically opposite points in their peripheries.

In testimony whereof, I have signed my name to this specification, in the presence of two subscribing witnesses.

MORRIS P. HOLMES.

Witnesses:
THEODORE B. JOHANNIS,
DEANE A. CABOT.